United States Patent
Arroyo et al.

(10) Patent No.: US 9,715,469 B1
(45) Date of Patent: *Jul. 25, 2017

(54) MIGRATING INTERRUPTS FROM A SOURCE I/O ADAPTER OF A SOURCE COMPUTING SYSTEM TO A DESTINATION I/O ADAPTER OF A DESTINATION COMPUTING SYSTEM

(71) Applicant: International Business Machines Corporation, Armonk, NY (US)

(72) Inventors: Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,570

(22) Filed: Oct. 21, 2016

(51) Int. Cl.
*G06F 3/00* (2006.01)
*G06F 5/00* (2006.01)
(Continued)

(52) U.S. Cl.
CPC ......... *G06F 13/24* (2013.01); *G06F 9/45558* (2013.01); *G06F 9/5077* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,209,994 B1 * | 4/2007 | Klaiber | G06F 9/45533 710/260 |
| 7,240,364 B1 | 7/2007 | Branscomb et al. | |

(Continued)

FOREIGN PATENT DOCUMENTS

| | | |
|---|---|---|
| CN | 101488092 A | 7/2009 |
| CN | 104737138 A | 6/2015 |
| JP | 5001818 B | 8/2012 |

OTHER PUBLICATIONS

Ajila et al., "Efficient Live Wide Area VM Migration With IP Address Change Using Type II Hypervisor", 2013 IEEE 14th International Conference on Information Reuse and Integration (IRI2013), Aug. 2013, pp. 372-379, IEEE Xplore Digital Library (online), DOI: 10.1109/IRI.2013.6642495.

(Continued)

*Primary Examiner* — Elias Mamo
(74) *Attorney, Agent, or Firm* — Brandon C. Kennedy; Robert R. Williams; Kennedy Lenart Spraggins LLP

(57) ABSTRACT

Migrating interrupts from a source I/O adapter of a source computing system to a destination I/O adapter of a destination computing system, includes: collecting, by a source hypervisor of the source computing system, interrupt mapping information, were the source hypervisor supports operation of a logical partition executing on the source computing system and the logical partition is configured to receive interrupts from the source I/O adapter; configuring, by the destination hypervisor of the destination computing system, the destination computing system with the interrupt mapping information collected by the source hypervisor; placing, by a destination hypervisor of the destination computing system, the destination I/O adapter in an error state; migrating the logical partition from the source computing system to the destination computing system; and restarting (Continued)

the logical partition on the destination computing system, including recovering, by the logical partition, from the error state.

20 Claims, 7 Drawing Sheets

(51) Int. Cl.
*G06F 13/24* (2006.01)
*G06F 13/42* (2006.01)
*G06F 9/455* (2006.01)
*G06F 9/50* (2006.01)

(56) References Cited

U.S. PATENT DOCUMENTS

| | | | |
|---|---|---|---|
| 7,613,898 | B2 | 11/2009 | Haertel et al. |
| 7,813,366 | B2 | 10/2010 | Freimuth et al. |
| 7,882,326 | B2 | 2/2011 | Armstrong et al. |
| 7,937,518 | B2 | 5/2011 | Boyd et al. |
| 7,984,262 | B2 | 7/2011 | Battista et al. |
| 8,219,988 | B2 | 7/2012 | Armstrong et al. |
| 8,321,722 | B2 | 11/2012 | Tanaka et al. |
| 8,327,086 | B2 | 12/2012 | Jacobs et al. |
| 8,429,446 | B2 | 4/2013 | Hara et al. |
| 8,533,713 | B2 | 9/2013 | Dong |
| 8,561,065 | B2 | 10/2013 | Cunningham et al. |
| 8,561,066 | B2 | 10/2013 | Koch et al. |
| 8,645,755 | B2 | 2/2014 | Brownlow et al. |
| 8,677,356 | B2 | 3/2014 | Jacobs et al. |
| 8,683,109 | B2 | 3/2014 | Nakayama et al. |
| 8,875,124 | B2 | 10/2014 | Kuzmack et al. |
| 8,984,240 | B2 | 3/2015 | Aslot et al. |
| 9,032,122 | B2 | 5/2015 | Hart et al. |
| 9,047,113 | B2 * | 6/2015 | Iwamatsu ............ G06F 9/45558 |
| 9,304,849 | B2 | 4/2016 | Arroyo et al. |
| 2002/0083258 | A1 * | 6/2002 | Bauman ................ G06F 13/24 710/311 |
| 2004/0064601 | A1 | 4/2004 | Swanberg |
| 2004/0205272 | A1 * | 10/2004 | Armstrong ............ G06F 9/4812 710/260 |
| 2007/0157197 | A1 * | 7/2007 | Neiger ................ G06F 9/45533 718/1 |
| 2007/0260768 | A1 | 11/2007 | Bender et al. |
| 2008/0005383 | A1 | 1/2008 | Bender et al. |
| 2008/0114916 | A1 | 5/2008 | Hummel et al. |
| 2008/0147887 | A1 | 6/2008 | Freimuth et al. |
| 2009/0249366 | A1 | 10/2009 | Sen et al. |
| 2010/0036995 | A1 | 2/2010 | Nakayama et al. |
| 2010/0250824 | A1 | 9/2010 | Belay |
| 2011/0197003 | A1 * | 8/2011 | Serebrin ............ G06F 9/45558 710/267 |
| 2011/0320860 | A1 | 12/2011 | Coneski et al. |
| 2012/0042034 | A1 | 2/2012 | Goggin et al. |
| 2012/0131576 | A1 | 5/2012 | Hatta et al. |
| 2012/0137288 | A1 | 5/2012 | Barrett et al. |
| 2012/0137292 | A1 | 5/2012 | Iwamatsu et al. |
| 2012/0167082 | A1 | 6/2012 | Kumar et al. |
| 2013/0159572 | A1 | 6/2013 | Graham et al. |
| 2013/0191821 | A1 | 7/2013 | Armstrong et al. |
| 2014/0149985 | A1 | 5/2014 | Takeuchi |
| 2014/0281263 | A1 | 9/2014 | Deming et al. |
| 2014/0351471 | A1 * | 11/2014 | Jebson .................... G06F 13/24 710/269 |
| 2014/0372739 | A1 | 12/2014 | Arroyo et al. |
| 2015/0120969 | A1 | 4/2015 | He et al. |
| 2015/0229524 | A1 | 8/2015 | Engebretsen et al. |
| 2016/0246540 | A1 | 8/2016 | Blagodurov et al. |

OTHER PUBLICATIONS

PCI-SIG, "Single Root I/O Virtualization and Sharing Specification-Revision 1.0", Sep. 2007, PCI-SIG Specifications Library, pcisig.com (online), URL: pcisig.com/specifications/iov/single_root/.

Axnix et al. "IBM z13 firmware innovations for simultaneous multithreading and I/O virtualization", IBM Journal of Research and Development, Jul./Sep. 2015, vol. 59, No. 4/5, 11-1, International Business Machines Corporation (IBM), Armonk, NY.

Salapura et al., "Resilient cloud computing", IBM Journal of Research and Development, Sep./Oct. 2013, vol. 57, No. 5, 10-1, 12 pages, International Business Machines Corporation (IBM), Armonk, NY.

Challa, "Hardware Based I/O Virtualization Technologies for Hypervisors, Configurations and Advantages—A Study", 2012 IEEE International Conference on Cloud Computing in Emerging Markets (CCEM), Oct. 2012, pp. 99-103, IEEE Xplore Digital Library (online), DOI: 10.1109/CCEM.2012.6354610.

Xu et al., "Multi-Root I/O Virtualization Based Redundant Systems", 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS. 2014.7044652.

AUS920160391US1, Appendix P; List of IBM Patent or Applications Treated as Related, Jan. 4, 2017, 2 pages.

* cited by examiner

MIGRATING INTERRUPTS FROM A SOURCE I/O ADAPTER OF A SOURCE COMPUTING SYSTEM TO A DESTINATION I/O ADAPTER OF A DESTINATION COMPUTING SYSTEM

BACKGROUND

Field of the Invention

The field of the invention is data processing, or, more specifically, methods, apparatus, and products for migrating interrupts.

Description of Related Art

A logical partition may be configured to utilize a physical, rather than virtual, I/O adapter. In current server-class systems there are large I/O fabrics incorporating many layers of bridge chips, switches, and I/O devices. The I/O devices themselves may be further virtualized in technologies such as SR-IOV. The routing and handling of interrupts generated by I/O devices involves both hardware configuration and software configuration across many layers of the system including the hypervisor and logical partition. The logical partition is made directly aware of which interrupts are associated with which I/O devices. Any changes to these relationships require the updated configuration mappings to be communicated across all parties. This limits both configuration flexibility and the ability to reconfigure (for example, due to hardware failure or resource movement).

SUMMARY

Methods, apparatus and products for migrating interrupts from a source input/output ('I/O') adapter of a source computing system to a destination I/O adapter of a destination computing system are disclosed in this specification. Such migration may be carried out by: collecting, by a source hypervisor of the source computing system, interrupt mapping information, where the source hypervisor supports operation of a logical partition executing on the source computing system and the logical partition is configured to receive interrupts from the source I/O adapter; configuring, by the destination hypervisor of the destination computing system, the destination computing system with the interrupt mapping information collected by the source hypervisor; placing, by a destination hypervisor of the destination computing system, the destination I/O adapter in an error state; migrating the logical partition from the source computing system to the destination computing system; and restarting the logical partition on the destination computing system, including recovering, by the logical partition, from the error state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
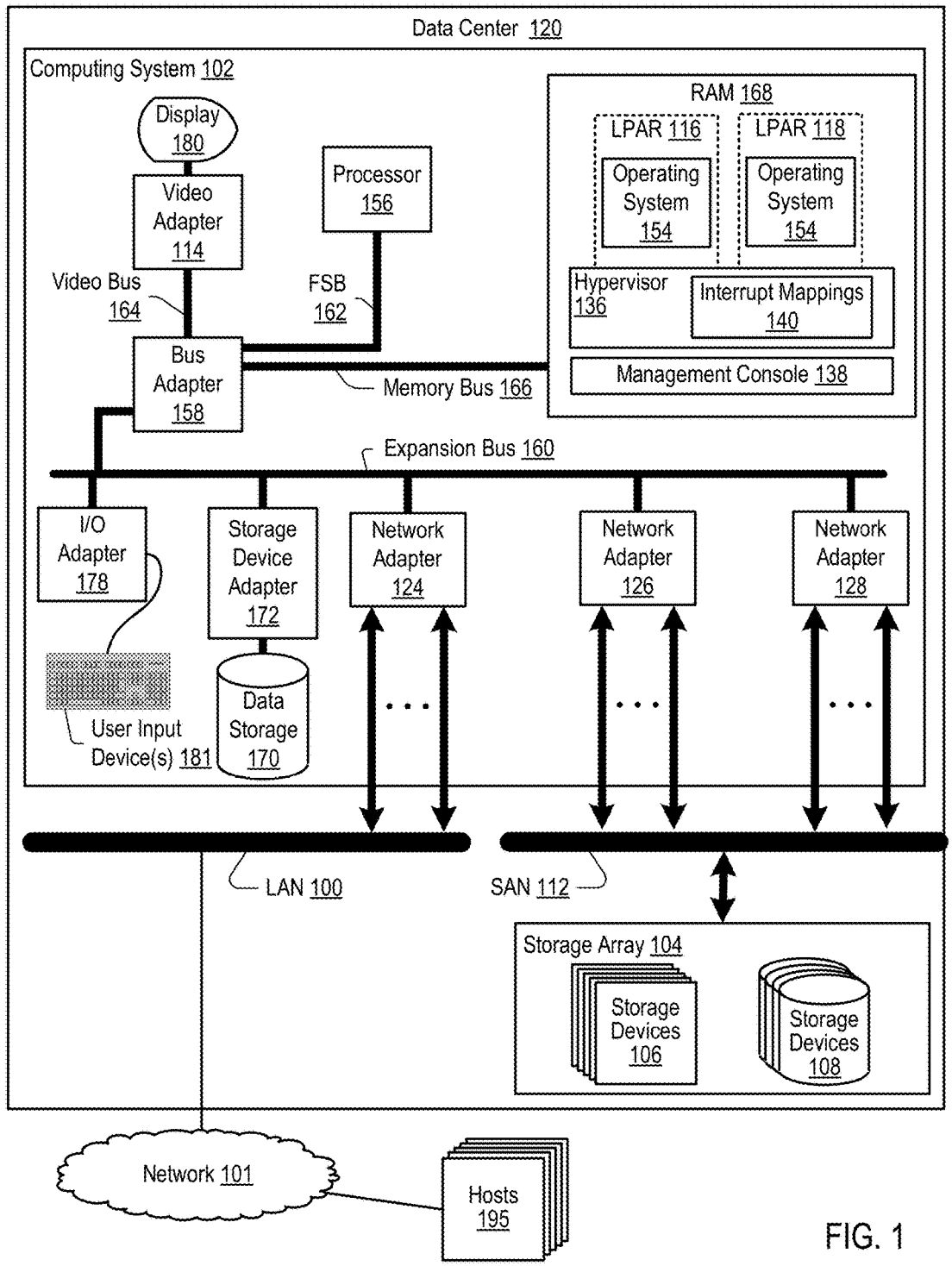
FIG. 1 sets forth an example system configured for migrating interrupts according to embodiments of the present invention.

Embodiments of methods, apparatus, and computer program products for migrating interrupts from a source I/O adapter of a source computing system to a destination I/O adapter of a destination computing system are described with reference to the accompanying drawings, beginning with FIG. 1. FIG. 1 sets forth an example system configured for migrating interrupts according to embodiments of the present invention. The example of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for migrating interrupts from a source I/O adapter to a destination I/O adapter according to embodiments of the present invention. One example type of I/O adapter that may be configured for such interrupt migration is an SR-IOV adapter. Readers will recognize that such SR-IOV adapters are only an example of a type of I/O adapter and that many different types of I/O adapters may be configured for interrupt migration according to embodiments of the present invention. SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition.

The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients. The management console (138) may also administer the migration of interrupts from the source I/O adapter of the source computing system to a destination I/O adapter of the destination computing system.

Also stored in RAM (168) are two instances of an operating system (154), one for each logical partition (116, 118). Operating systems useful in computers configured for interrupt migration according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware.

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for interrupt migration according to various embodiments include Integrated Drive Electronics ("IDE") adapters, Small Computing system Interface ("SCSI") adapters, and others as will occur to those of skill in the art. Non-volatile computer memory also may be implemented as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (104) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for interrupt migration according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices, such as storage devices (106) and storage devices (108).

From time to time and for various reasons, a logical partition may be migrated from one computing system, such as computing system (102), to another computing system, such as one of the hosts (195). In prior art embodiments in which the logical partition is coupled to an I/O adapter through a physical communication channel (rather than an entirely virtualized communications channel), the I/O adapter must be deconfigured from the logical partition completely prior to migration. Once migrated to the destination computing system, an I/O adapter would be added to the logical partition as if a new adapter were added to the system. Further, in some embodiments, the logical partition and I/O adapter are configured for interrupt processing. A logical partition migration that requires the deconfiguring of an I/O device and an addition of a new I/O device would generally require a complete reconfiguration of such interrupts.

When configuring a logical partition (116) for interrupts with a source I/O adapter, the hypervisor, upon instantiation of the logical partition may assign to the logical partition a number of logical interrupt source numbers, where each of the logical interrupt source numbers maps to a physical interrupt source number. The physical interrupt source number is a number, or identifier, that represents an interrupt raised in the processor by an I/O adapter. Such interrupts may be raised through various busses and in various ways. For example, some physical interrupts may be raised by asserting, by an adapter, a signal on a line of a bus dedicated for such interrupts or by sending an MSI (Message Signaled Interrupt) or MSI-X (MSI extended) message to the processor over the main system bus rather than on a dedicated interrupt line. Such MSI and MSI-X messages may be associated with a physical interrupt source number. That is, each I/O adapter may send out an MSI or MSI-X message to raise an interrupt, the content of the message may indicate the source of the message and be associated with at least one physical interrupt source number. The CPU may then raise an interrupt with the physical interrupt source number. The interrupt my cause system firmware, such as the hypervisor, to handle the interrupt. The hypervisor may determine which logical partition to which to direct the interrupt based on mappings of physical interrupt source numbers to logical interrupt source numbers, where each logical interrupt source number is assigned to a logical partition.

In the prior art, when such a logical partition is migrated from a source computing system to a destination computing system, and from a source I/O adapter (having interrupts mapped to logical interrupt source numbers of the logical partition) to a destination I/O adapter, the mappings of logical interrupt source numbers to the interrupts of the I/O adapter are lost. To that end, the computing system (102) of FIG. 1 may be configured for migrating interrupts from a source I/O adapter of a source computing system (102) to a destination I/O adapter of a destination computing system (195). Such migration may include: collecting, by a source hypervisor (136) of the source computing system (102), interrupt mapping information (140); configuring, by a destination hypervisor of the destination computing system (195), the destination computing system with the interrupt mapping information collected by the source hypervisor; placing, by the destination hypervisor of the destination computing system, the destination I/O adapter in an error state; migrating the logical partition (116) from the source computing system (102) to the destination computing system (195); and restarting the logical partition (116) on the destination computing system, including recovering, by the logical partition, from the error state.

Examples of such an I/O adapter may be the network adapters (124, 126, and 128) of FIG. 1. The network adapters (124, 126, and 128) are for purposes of illustration, not for limitation. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
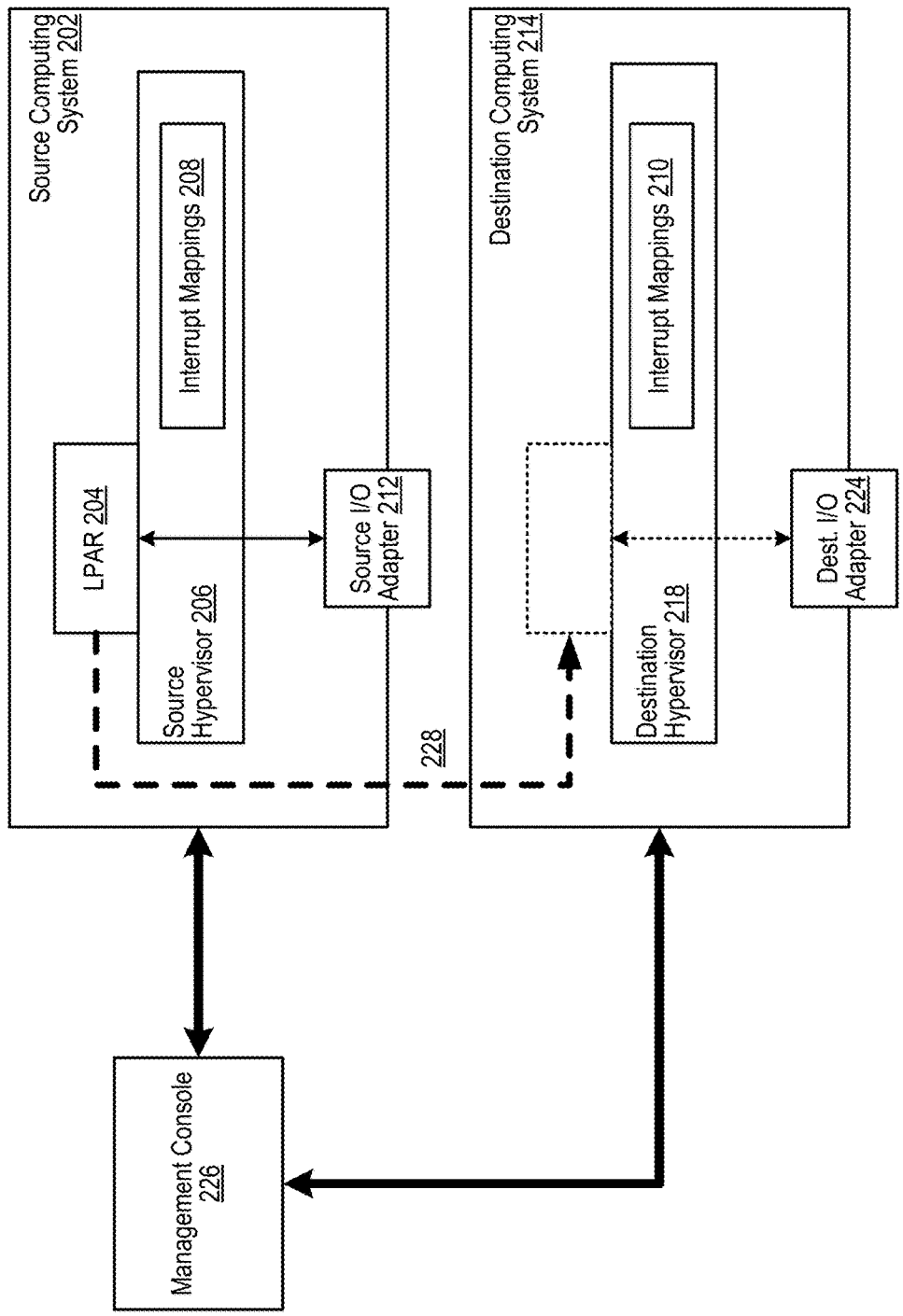
FIG. 2 sets forth a functional block diagram of an example system configured for interrupt migration according to embodiments of the present invention.

For further explanation, FIG. 2 sets forth a functional block diagram of an example system configured for interrupt migration according to embodiments of the present invention. The example system of FIG. 2 includes a management console (226). A management console may be implemented as a module of automated computing machinery comprising computer hardware and software. The management console (226) may be coupled to a source computing system (202) and a destination computing system (214) through various networking devices, protocols, and fabrics. The management console may provide a user interface through which a user may direct a hypervisor on instantiating and maintaining logical partitions, where each logical partition may provide virtualization services to one or more clients. The management console (226) may also direct hypervisors to migrate logical partitions from one computing system to another computing system.

In the example of FIG. 2, the source computing system (202) is a computing system similar that depicted in the example of FIG. 1. The term 'source' is used here solely to denote that the computing system is the origin of a migration of I/O interrupts. Likewise, the destination computing system (214) in the example of FIG. 2 may be a computing system similar to that depicted in the example of FIG. 1 and the term 'destination' is utilized merely to indicate that the computing system is a target of a migration of I/O interrupts.

The example source computing system (202) of FIG. 2 include a source hypervisor (206) that supports execution of at least one logical partition (204). The logical partition is coupled to a source I/O adapter (212) for I/O operations. Upon instantiation of the logical partition, the source hypervisor (206) may assign one or more logical interrupt source numbers to the logical partition (204). The logical partition (204) is generally unaware that the logical interrupt source numbers are, in fact, logical. The hypervisor may map each of the logical interrupt source numbers to a physical interrupt source number that is generated in the computer processor of the computing system (202) when an interrupt is raised by an I/O adapter.

Consider, for example, that the source I/O adapter (212) is configured for MSI, where sending a message with particular data indicates to the CPU (not shown) of the computing system or interrupt controller that source I/O adapter (212) is raising an interrupt. Such an interrupt is identified in the CPU by a physical interrupt source number (PISN), say PISN #4. The PISN is provided to the hypervisor (206) when the CPU interrupts the hypervisor and passes control to the hypervisor to satisfy the interrupt. The hypervisor (216) may then look up, in the interrupt mappings (208), a logical interrupt source number (LISN), say LISN #21, that is associated with the PSIN #4. The LISN #21 is associated with the logical partition (204), and the hypervisor raises an interrupt in the operating system of the logical partition (204) utilizing the LISN #21 found in the interrupt mappings to be associated with PISN #4 that the CPU utilized to represent the interrupt raised by the source I/O adapter (212). Moreover, upon original assignment of the logical interrupt source numbers to the logical partition (204), the hypervisor (216) informs the logical partition (204) of the source of each of the interrupts. That is, when the interrupt having LISN #21 is raised in the logical partition, the operating system of the logical partition is aware that interrupt 21 is associated with the source I/O adapter (212) and the proper driver is executed to handle the interrupt.

In the example of FIG. 2, the management console (226) initiates a logical partition migration. One example of a logical partition migration is called live partition mobility in which the logical partition is migrated while in operation, without a full shutdown and restart of the operating system of the logical partition. One obstacle to such live migrations in the prior art is the existence of interrupt mappings between the logical partition to be moved and a source I/O adapter. In prior art systems, the source I/O adapter must be deconfigured from the system, essentially removing all interrupt mappings entirely, prior to the logical partition being migrated. Upon restarting the logical partition on the destination computing system, a new I/O adapter would be added to the system and the logical partition would be required to create new interrupt mappings for the new I/O adapter.

By contrast, the system of FIG. 2 is configured for interrupt migration according to embodiments of the present invention. The management console (226) may orchestrate the migration (228) of the logical partition (204) from the source computing system (202) to the destination computing system (214) by first instructing the source hypervisor (206) to prepare for migration. The source hypervisor (206), among other operations to prepare for the logical partition's (204) migration, may collect, by a source hypervisor of the source computing system, interrupt mapping information (218). In addition to the logical to physical interrupt source number mappings, in embodiments in which the source I/O adapter (212) and destination I/O adapter (224) are PCI adapters, the hypervisor may also collect a PCI configuration space address of the source I/O adapter and physical interrupt source numbers that are mapped to the source I/O adapter (through use of the PCI configuration space address). The PCI configuration space address is utilized to address the configuration space of a PCI adapter. Such an address may also be referred to as a requester identifier or ('RID'). In PCI-express architectures, each PCI device under a root complex is uniquely identified by such an RID. The RID may be a triplet of a bus number, device number, and function number. Such attributes may be assigned to the PCI adapter upon initialization and enumeration of the device in the system and be located in the configuration space of a PCI adapter. The RID may be used to control access to memory or other resources in the system.

Likewise, the destination hypervisor (218) of the destination computing system (214) may be instructed by the management console (226) to prepare for the migration by collecting interrupt mapping information (210) of the destination I/O adapter including the PCI configuration space address of the destination I/O adapter and a range of physical interrupt source numbers assigned to the destination I/O adapter.

The management console (226) may also instruct the destination hypervisor (218) to configure the destination computing system with the interrupt mapping information collected by the source hypervisor. Such a configuration may include mapping logical interrupt source numbers assigned to the logical partition for interrupts with the source I/O device to physical interrupt source numbers assigned to the destination I/O adapter.

The management console (226) may also instruct the destination hypervisor (218) to place the destination I/O adapter in an error state. Such an error state may include the 'EEH' (enhanced error handling) error state which is an extension to the PCI standard specification and enabled in systems running IBM's Power™ Processors.

The management console may then migrate (228) the logical partition (204) from the source computing system (202) to the destination computing system (214). Such a migration may include quiescing the logical partition and copying the logical partition from the source computing system memory to the destination computing system memory. At this time, the logical partition has not been restarted on the destination computing system.

Finally, the logical partition (204) may be restarted on the destination computing system. The term 'restart' is not equivalent to a reboot of the logical partition. Instead, 'restart' means 'resume.' That is, when the logical partition is migrated, it is first paused on the source computing system, then unpaused or resumed on the destination computing system. As part of the restarting process, the logical partition and destination I/O adapter may recover from the error state. The logical partition maintains the logical interrupt source numbers assigned when on the source computing system even after migration to the destination computing system (214). Further, the logical partition (204) may receive interrupts from the destination I/O with the same logical interrupt source numbers.

As mentioned above, in some embodiments, specifically in embodiments in which the I/O adapter is implemented as a PCIe adapter or SR-IOV adapter, the interrupt mapping information collected by the source hypervisor and utilized to update mapping information on the destination computing system may be implemented as one or more data structures. For further explanation, therefore, FIG. 3 sets forth a set of example interrupt mapping data structures in the form of several tables.

Figure 3:
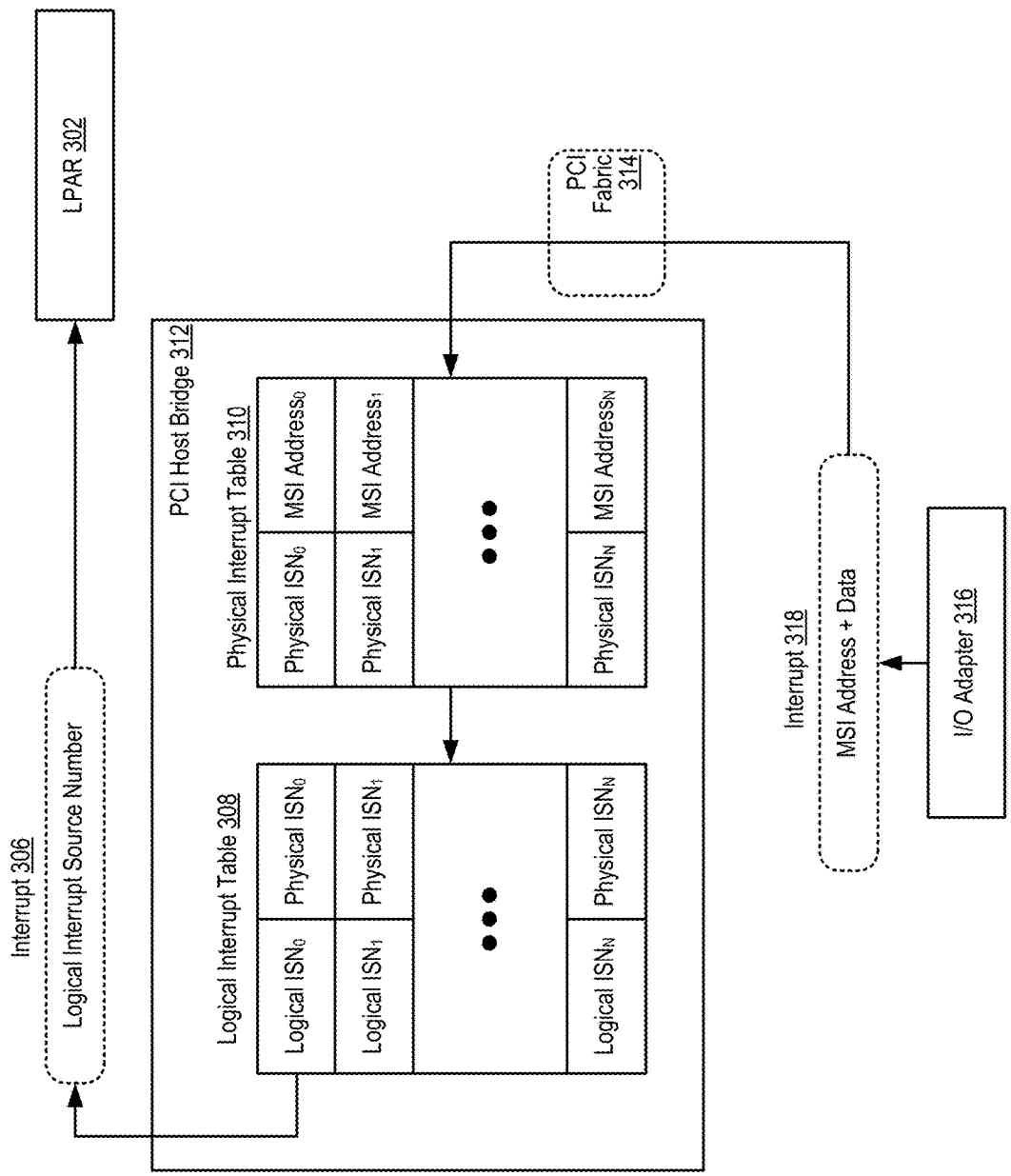
FIG. 3 sets forth a set of example interrupt mapping data structures in the form of several tables.

The example of FIG. 3 includes a PCI host bridge (312). A PCI host bridge enables data transfers between a host processor and PCI bus based devices. The PCI host bridge controls PCI bus transactions, generating PCI clock and reset signals. The PCI host bridge also generally operates to administer interrupts between PCI devices and the host processor. In the example of FIG. 3, the PCI host bridge couples, functionally, an I/O adapter (316) to a logical partition (302).

The I/O adapter (316) in the example of FIG. 3 generates an interrupt (318) on the PCI fabric (314). The interrupt (318), in the example of FIG. 3, may be an MSI based interrupt that includes an address and data. The address and data are utilized to identify the source of the interrupt as many different I/O adapters (316) may be coupled to the PCI fabric (314).

The PCI host bridge (312) receives the interrupt (318), and using the address included in the interrupt as an index, looks up an associated physical interrupt source number in a physical interrupt table (310). The host processor, not shown here, allots a number of physical interrupt source numbers to the PCI peripherals. The PCI host bridge (312) upon enumerating an I/O adapter (316) to the system, assigns one or more address to be used for MSI in the PCI configuration space of the I/O adapter and associates each address with one of the allotted physical interrupt source numbers. Such associations are stored, in the example of FIG. 3, in records of a physical interrupt table (310).

A hypervisor, not show here, upon instantiating a logical partition (302) and provisioning an I/O adapter (316) to the logical partition, assigns one or more logical interrupt source numbers to the logical partition for interrupts raised by the I/O adapter (316). Each such logical interrupt source number is associated with one of the physical interrupt source numbers that is associated with the MSI address of the I/O adapter. Such mappings may be stored in the hypervisor or, as in the example of FIG. 3, in records of a logical interrupt table (308) of the PCI host bridge (312). Each record in the logical interrupt table (308) includes an association of a physical interrupt source number to a logical interrupt source number. The PCI host bridge, after translating the MSI address to a physical interrupt source number, then translates the physical interrupt source number to a logical interrupt source number.

The PCI host bridge then provides an interrupt (306) to the logical partition (302) with the logical interrupt source number. The logical partition, or more accurately the driver in the logical partition for the I/O adapter, then handles the interrupt (306). In embodiments of the present invention, when a logical partition (302) switches from a source I/O adapter to a destination I/O adapter, the logical partition maintains the logical interrupt source numbers originally assigned to the logical partition. All other mappings are update so that the destination I/O adapter's interrupts map to the same logical interrupt source numbers. In this way, the source I/O adapter need not be completely deconfigured, the logical interrupt source numbers removed, the destination I/O adapter added, and new logical interrupt source numbers assigned.

Figure 4:
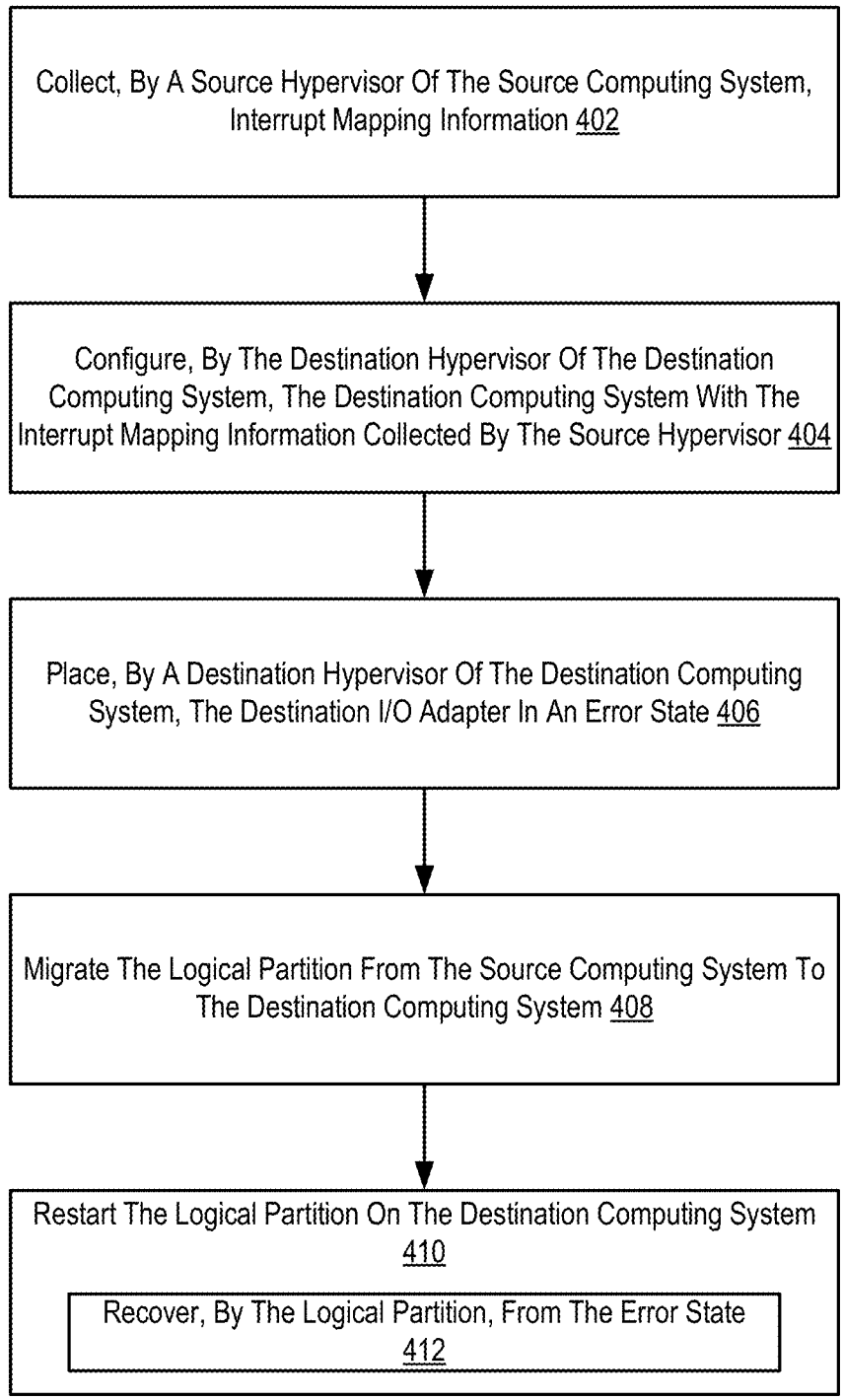
FIG. 4 sets forth a flow chart illustrating an exemplary method for migrating interrupts from a source I/O adapter of a source computing system to a destination I/O adapter of a destination computing system according to embodiments of the present invention.

For further explanation, FIG. 4 sets forth a flow chart illustrating an exemplary method for migrating interrupts from a source I/O adapter of a source computing system to a destination I/O adapter of a destination computing system according to embodiments of the present invention. In the method of FIG. 4, the source hypervisor supports operation of a logical partition executing on the source computing system and the logical partition is configured to receive interrupts from the source I/O adapter.

The method of FIG. 4 includes collecting (402), by a source hypervisor of the source computing system, interrupt mapping information. Collecting (402) interrupt mapping information may include collecting a PCI configuration space address of the source I/O adapter; collecting physical interrupt source numbers that are mapped to the source I/O adapter; and collecting logical interrupt source numbers, assigned to the logical partition, that are mapped to the physical interrupt source numbers.

The method of FIG. 4 also includes configuring (404), by a destination hypervisor of the destination computing system, the destination computing system with the interrupt mapping information collected by the source hypervisor. Configuring (404) the destination computing system with the interrupt mapping information collected by the source hypervisor may include updating mapping tables in the hypervisor, in a host bridge or interrupt controller, and the like.

The method of FIG. 4 also includes placing (406), by the destination hypervisor of the destination computing system, the destination I/O adapter in an error state. Placing (406) the destination I/O adapter in an error state may be carried out by setting one or more flags in a register of the destination I/O adapter designated for such purpose, sending a message to the I/O adapter on the bus that indicates an error has arisen, and in other ways as will occur to readers of skill in the art. Such an error state may include the 'EEH' (enhanced error handling) error state which is an extension to the PCI standard specification and enabled in systems running IBM's Power™ Processors.

The method of FIG. 4 also includes migrating (408) the logical partition from the source computing system to the destination computing system. Migrating (408) the logical partition from the source to the destination computing system may be carried out by quiescing the logical partition (pausing the operation of the logical partition) and copying the logical partition from source memory to destination memory.

The method of FIG. 4 also includes restarting (410) the logical partition on the destination computing system. Restarting (410) the logical partition may include resuming execution of the logical partition by the destination hypervisor. Restarting (410) the logical partition in the example of FIG. 4 also includes recovering (412), by the logical partition, from the error state. Recovering (412) from the error state may include setting a flag in a register or injecting a notification into data on the bus directed to the I/O adapter that indicates the error has been corrected. The I/O adapter may restart and couple to the logical partition as if the two had been previously coupled.

Figure 5:
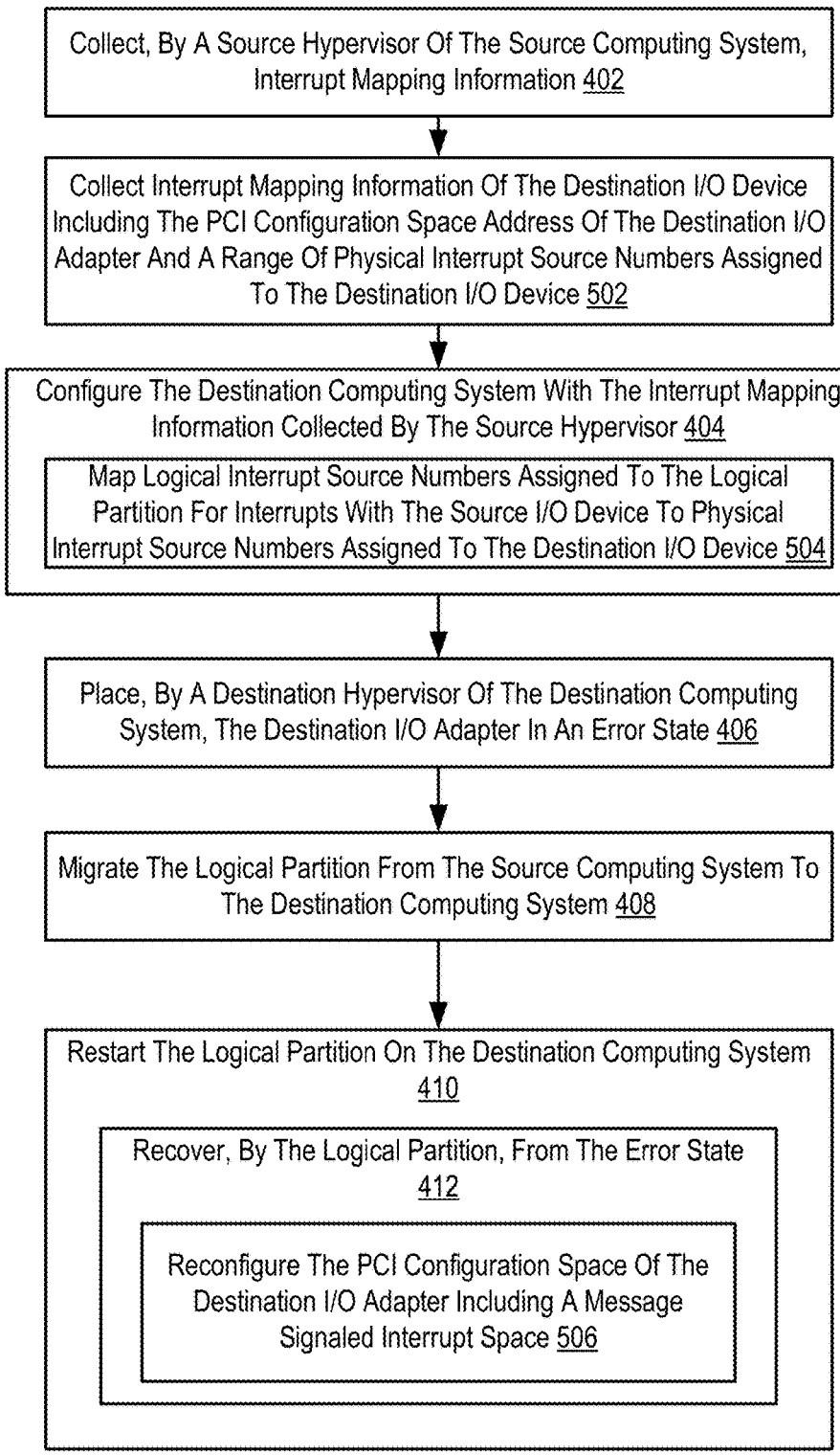
FIG. 5 sets forth a flow chart illustrating a further exemplary method for interrupt migration according to embodiments of the present invention.

For further explanation, FIG. 5 sets forth a flow chart illustrating a further exemplary method for interrupt migration according to embodiments of the present invention. The method of FIG. 5 is similar to the method of FIG. 4 in that the method of FIG. 5 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured to receive interrupts from the source I/O adapter. The method of FIG. 5 is also similar to the method of FIG. 5 in that the method of FIG. 5 includes: collecting (402) interrupt mapping information; configuring (404) the destination computing system with the interrupt mapping information collected by the source hypervisor; placing (406) the destination I/O adapter in an error state; migrating (408) the logical partition from the source computing system to the destination computing system; and restarting (410) the logical partition on the destination computing system, including recovering (412), by the logical partition, from the error state.

The method of FIG. 5 differs from the method of FIG. 4 in that in the method of FIG. 5, the source and destination I/O adapters are implemented as PCI adapters. A PCI adapter as the term is used here encompasses any type of PCI, including, but not limited to, PCIe or SR-IOV. To that end, the method of FIG. 5 includes collecting (502) interrupt mapping information of the destination I/O adapter including the PCI configuration space address of the destination I/O adapter and a range of physical interrupt source numbers assigned to the destination I/O adapter. Such collection may be carried out by querying tables in an PCI host bridge or interrupt controller, by querying tables in a hypervisor, by querying the configuration space of the destination I/O adapter to identify the addresses originally programmed into the destination I/O adapter upon enumeration of the device for purposes of MSI or MSI-X interrupts, and so on as will occur to readers of skill in the art.

In the method of FIG. 5, configuring (404) the destination computing system with the interrupt mapping information collected by the source hypervisor is carried out by mapping (504) logical interrupt source numbers assigned to the logical partition for interrupts with the source I/O device to physical interrupt source numbers assigned to the destination I/O adapter. Such mapping (504) may be carried out by updating tables in a PCI host bridge, an interrupt controller and/or the destination hypervisor.

As mentioned above, in some embodiments the source and destination I/O adapter may implement MSI or MSI-X (an extended form of MSI). Such MSI must be configured in the destination I/O adapter. To that end, in the example of FIG. 5, recovering (412) from the error state also includes reconfiguring (506) the PCI configuration space of the destination I/O adapter including a message signaled interrupt space. Such reconfiguration of the MSI space may occur at any time prior to the logical partition and the I/O adapter communicating. In this example, the reconfiguration takes place as part of a recovery from an error. In such a recover, the adapter may deassert and reassert itself on the bus. Upon such a reassertion, the destination hypervisor may address the PCI configuration space using the PCI configuration space address previously collected to configure the MSI addresses that the destination I/O adapter is to use for interrupts.

Figure 6:
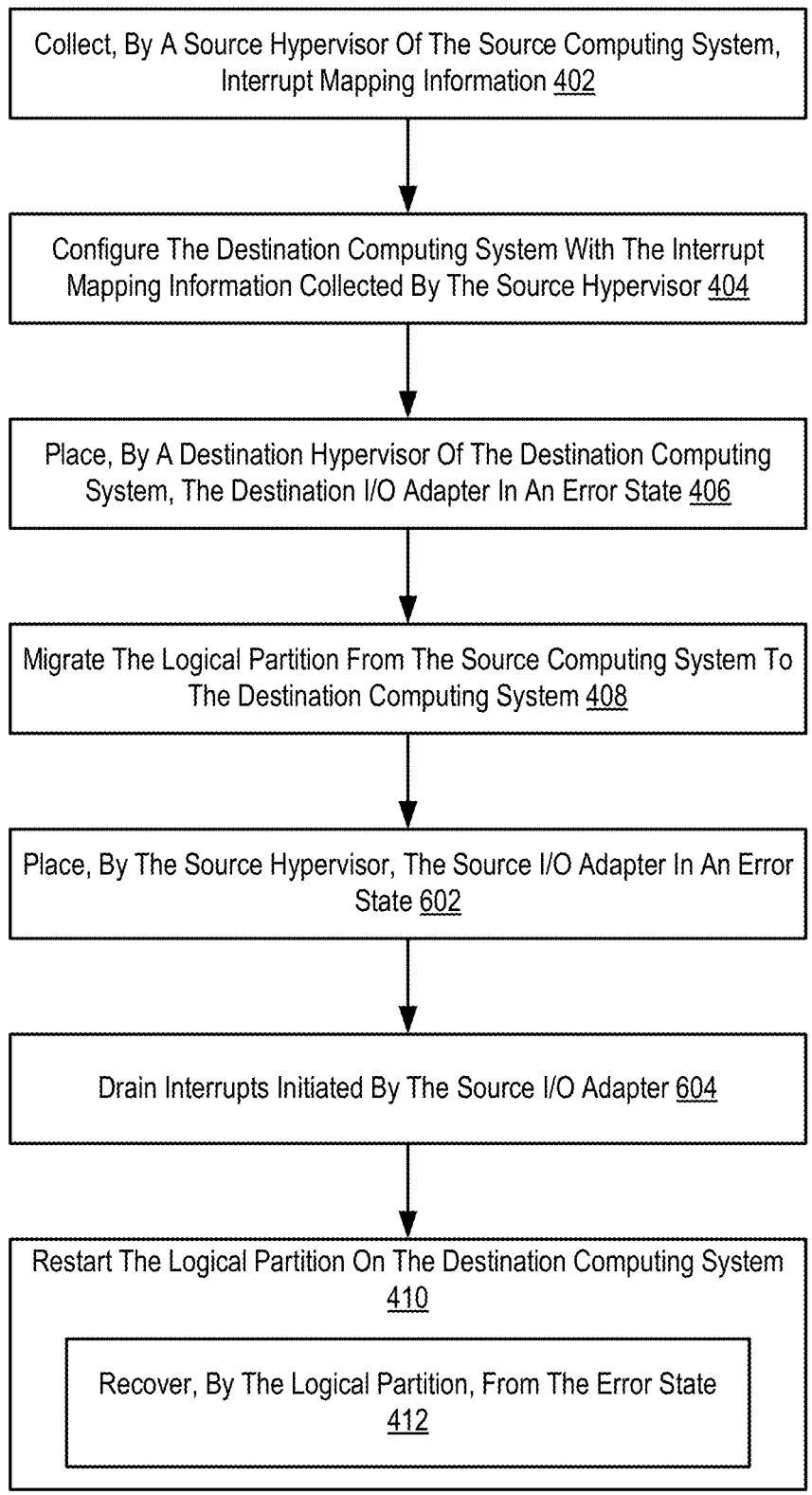
FIG. 6 sets forth a flow chart illustrating a further exemplary method for interrupt migration according to embodiments of the present invention.

For further explanation, FIG. 6 sets forth a flow chart illustrating a further exemplary method for interrupt migration according to embodiments of the present invention. The method of FIG. 6 is similar to the method of FIG. 4 in that the method of FIG. 6 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured to receive interrupts from the source I/O adapter. The method of FIG. 6 is also similar to the method of FIG. 6 in that the method of FIG. 6 includes: collecting (402) interrupt mapping information; configuring (404) the destination computing system with the interrupt mapping information collected by the source hypervisor; placing (406) the destination I/O adapter in an error state; migrating (408) the logical partition from the source computing system to the destination computing system; and restarting (410) the logical partition on the destination computing system, including recovering (412), by the logical partition, from the error state.

The method of FIG. 6 differs from the method of FIG. 4 in that the method of FIG. 6 also includes placing (602), by the source hypervisor, the source I/O adapter in an error state and draining (604) interrupts initiated by the source I/O adapter. Such a draining of interrupts ensures that operation of the source computing system is not interrupted by an I/O adapter that is no longer coupled to a logical partition. In addition to draining the interrupts, the source hypervisor may also remove the mappings of physical interrupt source numbers to logical interrupt source numbers in the source computing system and deconfigure the source I/O adapter from the system.

Figure 7:
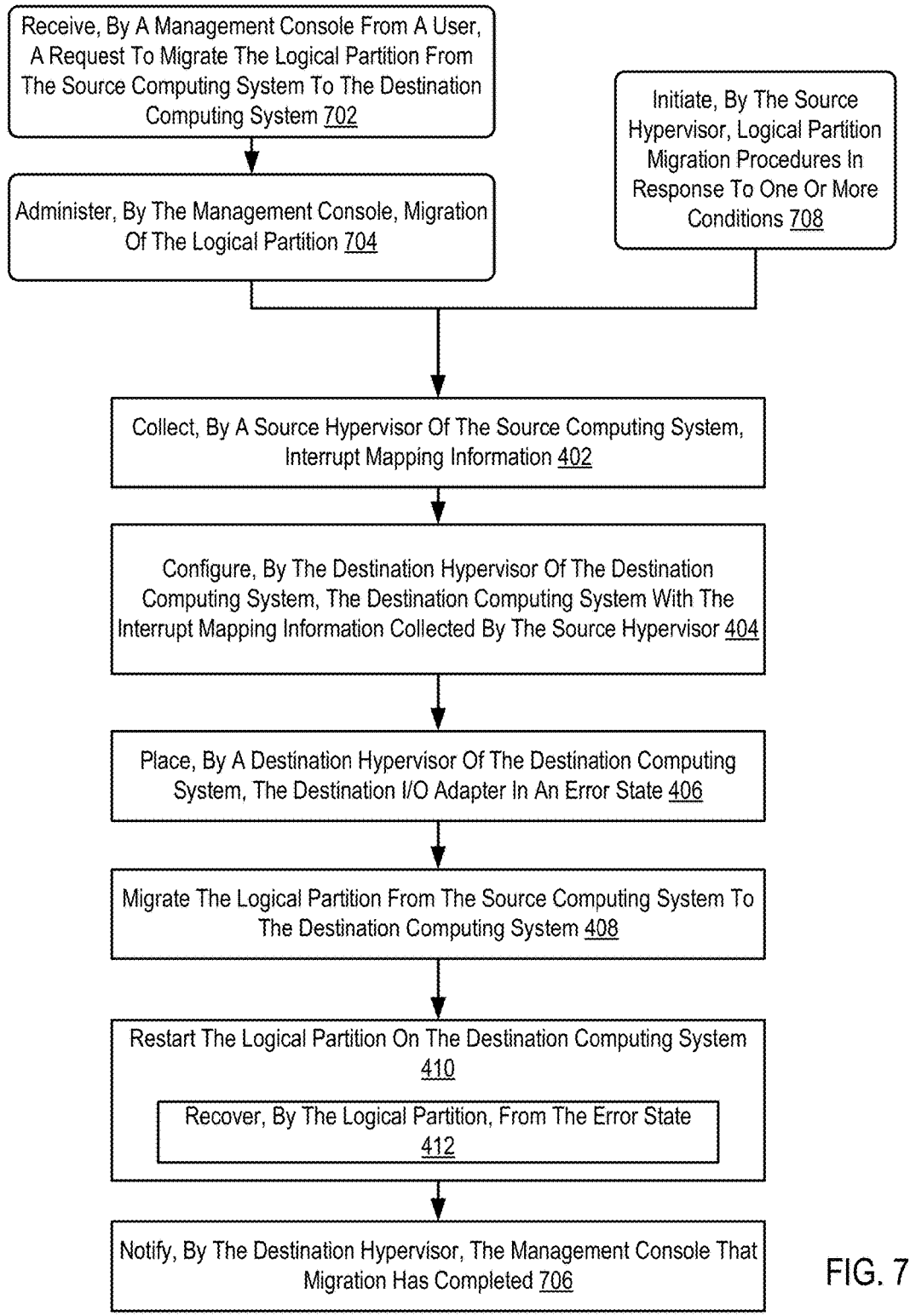
FIG. 7 sets forth a flow chart illustrating a further exemplary method for interrupt migration according to embodiments of the present invention.

For further explanation, FIG. 7 sets forth a flow chart illustrating a further exemplary method for interrupt migration according to embodiments of the present invention. The method of FIG. 7 is similar to the method of FIG. 4 in that the method of FIG. 7 is also carried out in a system including a source computing system that includes a source I/O adapter and a destination computing system that includes a destination I/O adapter. The source computing system also includes a source hypervisor that supports operation of a logical partition executing on the source computing system, where the logical partition is configured to receive interrupts from the source I/O adapter. The method of FIG. 7 is also similar to the method of FIG. 7 in that the method of FIG. 7 includes: collecting (402) interrupt mapping information; configuring (404) the destination computing system with the interrupt mapping information collected by the source hypervisor; placing (406) the destination I/O adapter in an error state; migrating (408) the logical partition from the source computing system to the destination computing system; and restarting (410) the logical partition on the destination computing system, including recovering (412), by the logical partition, from the error state.

The method of FIG. 7 differs from the method of FIG. 4 in that the method of FIG. 7 includes various alternatives for initiating the migration procedures of the logical partition. For example, the method of FIG. 7 includes receiving (702), by the management console from a user, a request to migrate the logical partition from the source computing system to the destination computing system and administering (704), by the management console, migration of the logical partition. The management console may provide a user interface through which a user may instruct the management console on various management operations of logical partitions. One such management operation may be migrating a logical partition. In this example, the management console may receive user instructions through the user interface to migrate the logical partition on the source computing device to the destination computing device.

Administering (704) the migration of the logical partition may include communicating with the source and destination hypervisor to initiate the logical partition migration, and orchestrate the migration after particular steps. For example, migrating (406) the logical partition may include first pausing the logical partition then copying the logical partition from the source to the destination. Although in some embodiments, the source and destination hypervisors may communicate directly to effect such a migration, in other embodiments, the source hypervisor may inform the management console upon the logical partition being paused, and the management console may initiate the copy of the logical partition. Further, the management console may perform various operations to prepare the destination computing system for the migration, prior to the logical partition being copied. Configuring memory space for the logical partition is one example preparation that may be initiated by the management console.

To that end, the method of FIG. 7 also includes notifying (706), by the destination hypervisor, the management console that migration has completed. Such a notification may then be passed along to a user that initiated the migration procedures or logged.

In other embodiments, the migration may be initiated, not by user direction or the management console, but dynamically in response to various conditions. To that end, the method of FIG. 7 also includes initiating (708), by the source hypervisor, logical partition migration procedures in response to one or more conditions. Such conditions may include failover conditions, workload balancing conditions, power consumption conditions, timing conditions, resource distribution conditions, and the like. In such an example, the source hypervisor may be provided with a set of rules that specify migration to be carried out when such conditions are met.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating interrupts from a source input/output ('I/O') adapter of a source computing system to a destination I/O adapter of a destination computing system, the method comprising:
    collecting, by a source hypervisor of the source computing system, interrupt mapping information, wherein the source hypervisor supports operation of a logical partition executing on the source computing system and the logical partition is configured to receive interrupts from the source I/O adapter;
    configuring, by a destination hypervisor of the destination computing system, the destination computing system with the interrupt mapping information collected by the source hypervisor;
    placing, by the destination hypervisor of the destination computing system, the destination I/O adapter in an error state;
    migrating the logical partition from the source computing system to the destination computing system; and
    restarting the logical partition on the destination computing system, including recovering, by the logical partition, from the error state.

2. The method of claim 1 wherein the source I/O adapter comprises a PCI adapter and collecting interrupt mapping information further comprises:
    collecting a PCI configuration space address of the source I/O adapter;
    collecting physical interrupt source numbers that are mapped to the source I/O adapter; and
    collecting logical interrupt source numbers, assigned to the logical partition, that are mapped to the physical interrupt source numbers.

3. The method of claim 1 wherein:
    the source and destination I/O adapters comprise PCI adapters;
    the method further comprises collecting interrupt mapping information of the destination I/O adapter including the PCI configuration space address of the destination I/O adapter and a range of physical interrupt source numbers assigned to the destination I/O adapter; and configuring the destination computing system with the interrupt mapping information collected by the source hypervisor further comprises mapping logical interrupt source numbers assigned to the logical partition for interrupts with the source I/O device to physical interrupt source numbers assigned to the destination I/O adapter.

4. The method of claim 3 wherein recovering, by the logical partition, from the error state further comprises reconfiguring the PCI configuration space of the destination I/O adapter including a message signaled interrupt space.

5. The method of claim 1 further comprising:
placing, by the source hypervisor, the source I/O adapter in an error state; and
draining interrupts initiated by the source I/O adapter.

6. The method of claim 1 wherein a management console is coupled to the source and destination computing systems and the method further comprises administering, by the management console, migration of the logical partition.

7. The method of claim 6 further comprising:
at a time after restarting the logical partition on the destination computing system, notifying, by the destination hypervisor, the management console that migration has completed.

8. The method of claim 6 further comprising:
receiving, by the management console from a user, a request to migrate the logical partition from the source computing system to the destination computing system.

9. The method of claim 1 further comprising:
initiating, by the source hypervisor, logical partition migration procedures in response to one or more conditions.

10. An apparatus for migrating interrupts from a source input/output ('I/O') adapter of a source computing system to a destination I/O adapter of a destination computing system, the apparatus comprising a computer processor, a computer memory operatively coupled to the computer processor, the computer memory having disposed within it computer program instructions that, when executed by the computer processor, cause the apparatus to carry out the steps of:
collecting, by a source hypervisor of the source computing system, interrupt mapping information, wherein the source hypervisor supports operation of a logical partition executing on the source computing system and the logical partition is configured to receive interrupts from the source I/O adapter;
configuring, by a destination hypervisor of the destination computing system, the destination computing system with the interrupt mapping information collected by the source hypervisor;
placing, by the destination hypervisor of the destination computing system, the destination I/O adapter in an error state;
migrating the logical partition from the source computing system to the destination computing system; and
restarting the logical partition on the destination computing system, including recovering, by the logical partition, from the error state.

11. The apparatus of claim 10 wherein the source I/O adapter comprises a PCI adapter and collecting interrupt mapping information further comprises:
collecting a PCI configuration space address of the source I/O adapter;
collecting physical interrupt source numbers that are mapped to the source I/O adapter; and
collecting logical interrupt source numbers, assigned to the logical partition, that are mapped to the physical interrupt source numbers.

12. The apparatus of claim 10 wherein:
the source and destination I/O adapters comprise PCI adapters;
the apparatus further comprises computer program instructions that, when executed by the computer processor, cause the apparatus to carry out the step of collecting interrupt mapping information of the destination I/O adapter including the PCI configuration space address of the destination I/O adapter and a range of physical interrupt source numbers assigned to the destination I/O adapter; and
configuring the destination computing system with the interrupt mapping information collected by the source hypervisor further comprises mapping logical interrupt source numbers assigned to the logical partition for interrupts with the source I/O device to physical interrupt source numbers assigned to the destination I/O adapter.

13. The apparatus of claim 12 wherein recovering, by the logical partition, from the error state further comprises reconfiguring the PCI configuration space of the destination I/O adapter including a message signaled interrupt space.

14. The apparatus of claim 10 further comprising computer program instructions that, when executed by the computer processor, cause the apparatus to carry out the steps of:
placing, by the source hypervisor, the source I/O adapter in an error state; and
draining interrupts initiated by the source I/O adapter.

15. The apparatus of claim 10 wherein a management console is coupled to the source and destination computing systems and the apparatus further comprises computer program instructions that, when executed by the computer processor, cause the apparatus to carry out the steps of administering, by the management console, migration of the logical partition.

16. A computer program product for migrating interrupts from a source input/output ('I/O') adapter of a source computing system to a destination I/O adapter of a destination computing system, the computer program product disposed upon a non-transitory computer readable medium, the computer program product comprising computer program instructions that, when executed, cause a computer to carry out the steps of:
collecting, by a source hypervisor of the source computing system, interrupt mapping information, wherein the source hypervisor supports operation of a logical partition executing on the source computing system and the logical partition is configured to receive interrupts from the source I/O adapter;
configuring, by a destination hypervisor of the destination computing system, the destination computing system with the interrupt mapping information collected by the source hypervisor;
placing, by the destination hypervisor of the destination computing system, the destination I/O adapter in an error state;
migrating the logical partition from the source computing system to the destination computing system; and
restarting the logical partition on the destination computing system, including recovering, by the logical partition, from the error state.

17. The computer program product of claim 16 wherein the source I/O adapter comprises a PCI adapter and collecting interrupt mapping information further comprises:
  collecting a PCI configuration space address of the source I/O adapter;
  collecting physical interrupt source numbers that are mapped to the source I/O adapter; and
  collecting logical interrupt source numbers, assigned to the logical partition, that are mapped to the physical interrupt source numbers.

18. The computer program product of claim 16 wherein:
  the source and destination I/O adapters comprise PCI adapters;
  the computer program product further comprises computer program instructions that, when executed, cause the computer to carry out the step of collecting interrupt mapping information of the destination I/O adapter including the PCI configuration space address of the destination I/O adapter and a range of physical interrupt source numbers assigned to the destination I/O adapter; and
  configuring the destination computing system with the interrupt mapping information collected by the source hypervisor further comprises mapping logical interrupt source numbers assigned to the logical partition for interrupts with the source I/O device to physical interrupt source numbers assigned to the destination I/O adapter.

19. The computer program product of claim 18 wherein recovering, by the logical partition, from the error state further comprises reconfiguring the PCI configuration space of the destination I/O adapter including a message signaled interrupt space.

20. The computer program product of claim 16 further comprising computer program instructions that, when executed, cause the computer to carry out the steps of:
  placing, by the source hypervisor, the source I/O adapter in an error state; and
  draining interrupts initiated by the source I/O adapter.

* * * * *